United States Patent [19]
Jahn et al.

[11] 3,885,159
[45] May 20, 1975

[54] MEASURING ELEMENT FOR THE DETECTION AND DETERMINATION OF RADIATION DOSES OF GAMMA RADIATION AND NEUTRONS

[75] Inventors: Walter Jahn, Ingelheim; Ernst Piesch, Leopoldshafen, both of Germany

[73] Assignees: Gesellschaft fur Kernforschung mbH, Karlsruhe; Jenaer Glaswerk Schott & Gen., Mainz, both of Germany

[22] Filed: Feb. 27, 1973

[21] Appl. No.: 336,217

[30] Foreign Application Priority Data
June 20, 1972 Germany.................... 2229662

[52] U.S. Cl. ............ 250/472; 250/473; 250/474
[51] Int. Cl. ............................................ G01t 1/06
[58] Field of Search ........... 250/472, 473, 474, 484

[56] References Cited
UNITED STATES PATENTS

| | | | |
|---|---|---|---|
| 2,939,959 | 6/1960 | Linschitz | 250/472 |
| 3,089,957 | 5/1963 | Bishay | 250/473 |
| 3,140,397 | 7/1964 | Henry | 250/472 |
| 3,247,379 | 4/1966 | Shurcliff | 250/484 |
| 3,604,931 | 9/1971 | Kastner et al | 250/472 |

*Primary Examiner*—Archie R. Borchelt
*Attorney, Agent, or Firm*—Spencer & Kaye

[57] ABSTRACT

A measuring element detects and proves both gamma and neutron radiation. The element includes a photoluminescent material which stores gamma radiation and particles of arsenic and phosphorus embedded in the photoluminescent material for detecting neutron radiation.

7 Claims, No Drawings

MEASURING ELEMENT FOR THE DETECTION AND DETERMINATION OF RADIATION DOSES OF GAMMA RADIATION AND NEUTRONS

The present invention relates to a measuring element for the detection and determination of radiation doses of gamma radiation and neutrons, which doses are approximately proportional to the gamma radiation dose and the biologically effective neutron dose and, in addition, allow the composition of the neutron spectrum to be assessed.

In most cases, two or more dosimeters are worn for personnel monitoring purposes in areas of nuclear facilities exposed to radiation hazard; in addition to gamma radiation these detectors mainly indicate neutron radiation. Thus, for instance, glass dosimeters are used to measure the gamma dose. Neutrons are measured with additional activation foils, for instance in a combination of probes made of gold, gold in cadmium, copper, indium and sulfur. However, other dosimeter combinations are known which consist of identical or different types of glass. If the glasses are identical, the second glass is surrounded additionally with neutron absorbing substances (activation and absorber substances), such as boron, cadmium or fissile material. For fluorescence measurements, at least one glass will indicate the gamma and neutron doses, while the other glass indicates the gamma dose. A similar result can be achieved by two types of glasses of different neutron sensitivities. However, the physical properties resulting from their composition make glasses suitable essentially only for the detection of thermal neutrons, which is done by way of fluorescence measurement and respectively, either by measuring the activity of the activation substances or by measuring the changes caused by the substances in the glass and on the surface of the glass, respectively. One of the interesting features after an exposure to neutrons may be the composition of the neutron spectrum, i.e., knowledge of the neutron fluence and the neutron dose, respectively, of fast, intermediate or thermal neutrons. According to previous methods a combination of various separate neutron probes was used which were evaluated individually. However, the effects of an exposure to ionizing particle radiation generated in a combination of probes due to the effect of neutrons can be indicated also as a total dose, if the individual probes were combined in accordance with their masses and geometrical arrangement. The present invention serves the purpose of creating a dosimeter consisting of one single measuring element for the detection of gamma and neutron radiations.

According to the present invention, this problem is solved in that the measuring element is made of a material storing gamma radiation by changing its chemical and physical properties; that one or more substances, which are suitable on the basis of their masses and halflifes, are homogeneously added to the material to emit particle radiation following neutron activation, which particle radiation makes a contribution to the storage of the gamma radiation which either be neglected or can be determined from the neutron dose; and that the material is permeable to that particle radiation and the secondary radiation, respectively generated in this process.

In an advanced embodiment of the present invention the material is a photoluminescent solid storing gamma radiation, and particles, for instance of arsenic and phosphorus, are imbedded in this photoluminescent material which can be excited by neutron radiation to emit beta particles or protons generating Čerenkov-radiation in the photoluminescent material which can then be detected.

In one embodiment of the present invention the photoluminescent material is a silver activated phosphate body which was vitrified by melting and cooling and whose phosphorus atoms can be excited into detectable proton emission by means of neutrons.

In another embodiment of the present invention the material may be an iron sulfate solution to which the substances, for instance arsenic and phosphorus, have been added for neutron activation.

This means that the present invention relates to a dosimeter for the detection of gamma radiation and neutrons, which dosimeter consists of a homogeneous transparent body which should preferably be a photoluminescent body with respect to the detection of gamma radiation, but acts as an activation probe with respect to the detection of neutrons and emitsionizing particle irradiation, especially beta radiation and protons, following neutron exposure, in which case the capability of the probe to emit ionizing particle radiation due to neutron exposure is so harmonized in terms of mass, geometry and halflife that the effect of the radiation emitted upon a radiation measuring instrument used evaluation is not only approximately proportional to the biologically effective neutron dose but also allows predictions to be made about the composition of the neutron spectrum, for instance on the basis of the relation between line intensities of the disintegration products of the substances.

One example of an embodiment mentioned here is a dosimeter using arsenic and phosphorus as the neutron probes. Natural arsenic-75 is converted into arsenic-76 by the action of intermediate and thermal neutrons, which arsenic-76 emits mainly beta radiation and disintegrates with a halflife of 26.5 hours. Fast neutrons are detected on the basis of a conversion from phosphorus $31P(n,p)31Si$ by neutron capture and subsequent proton emission into silicon-31 with a halflife of 2.6 hours. The beta activity or the proton activity of these detectors can easily be measured by measuring the Čerenkov-radiation induced in silver activated phosphate glass by these particle radiations. The measurements can be performed in a liquid scintillation counter. This measurement offers the following advantages: high count rate, good energy resolution, low noise, simple calibration, and separate measurement of the neutron fluences of fast and thermal neutrons in the same measuring element or counter.

If the mass fractions of arsenic and phosphorus, for instance a content of 0.1 percent of $As_2O_3$ in a body of silver activated phosphate glass, are accurately fixed, one measurement of the dosimeter will generate the direct reading of the neutron fluence or, alternatively, the neutron dose will be determined independent of the neutron spectrum by measuring the dosimeter within 4–8 hours following activation. Because of the different halflives of arsenic-76 and silicon-31 it is also possible to determine both activation fractions individually, if two measurements are performed following activation, for instance 6 and 24 hours after activation. On the basis of the ratio of count rates and the ratio of activities respectively, of silicon-31 and arsenic-76, determined from this measurement the dose fractions of fast and intermediate neutrons are obtained, which can be used to generate sufficient information about the composition of the neutron spectrum, at least in the energy range between 0.7 and 2.5 MeV. Additional measurement of the radiophotoluminescence results in the independent determination of the gamma dose to which a correction may have to be assigned, depending on the neutron fluence and neutron dose measured, respectively, which correction corresponds to the contribution to the radiophotoluminescence made by the electron and proton radiations, respectively, induced.

The use of silver activated beta phosphate glasses as photoluminescent bodies and measuring probes for gamma radiation is known. In principle, it is possible also by using the reaction 31P $(n,p)$ 31Si to detect neutrons, especially fast neutrons. However, detecting fast, intermediate and thermal neutrons together and breaking down their spectrum fractions is possible only by the joint existence of As and P.

The planned utilization of As was one of the risks inherent in the generation of photoluminescent centers which are required to store gamma radiation, because arsenic will easily interact with silver because of its easy change of valence, $As^{3+} \rightleftarrows As^{5+}+2e^-$, the presence of which silver is a prerequisite to radiophotoluminescence. A reduction of the silver ions into silver metal, which might occur, would result in the undesired establishment of centers of luminescence which might simulate an effect of radiation exposure, or would at least increase the characteristic luminescence, in this case a pre-dose, to an undesired extent. Hence, in the light of the knowledge existing about the behavior of arsenic in glass, an impairment of the dosimeter function of silver-activated glasses had to be taken into account. Hence, it was surprising to find that this negative effect did not occur or was so slight as to be undetectable by measurements.

It is a familiar fact that luminescence phenomena can be inhibited also in different ways than by the enforced change of valence by chemical reactions. This is due mainly to structural factors; substances, especially heavy metal ions, would block luminescence centers. Very effective substances in this regard are ions of iron which impair the radiophotoluminescence of silver activated phosphate glasses even in very small concentration. Surprisingly enough, however, radiophotoluminescence, which reacts very sensitively to impurities, is not disturbed by the heavy metal ion of arsenic.

EXAMPLE 2.8 g boron trioxide, 19.2 g lithium orthophosphate, 27.4 g aluminum pyrophosphate, 46.6 g phosphorpentoxide, 3.9 g silver oxide, and 0.1 g arsenic trioxide are put into a ceramic crucible at a temperature of 1200°C, refined at 1220°C for 90 minutes, stirred at 1040°C for 30 minutes and after brief settling at a temperature of 1020°C poured into a pre-heated iron mold and slowly cooled. The result is a colorless, strain-free, schlieren-free glass with a low void content which is further processed by the conventional methods.

During the melt the metaphosphate material may be kept under a highly oxidizing atmosphere which can consist of pure oxygen. In this way, arsenic used as an additive, which is added to the mixture simultaneously with silver oxide, will be oxidized continuously and thus a reduction of silver will be prevented. This oxidation can be improved still further if gaseous oxidants are sparged or run through the melt, which is easily achieved by means of suitable devices, and homogeneous mixing of the melt with the oxidant is ensured up to solidification. However, the oxidizing atmosphere can be maintained also up to complete cooling.

This example is one out of many compositions, both with respect to the basic formula of the solid state detector and the substances used for the probe.

We claim:

1. Measuring element for proving and determining radiation does of gamma radiation and neutrons,, the proof and determination of the gamma radiation being proportional to the gamma radiation dose and the proof of the neutrons being proportional to the effective neutron dose, it being additionally possible to determine the curve of the neutron sepctrum, characterized in that the measuring element is a body of a photoluminescent material which stores gamma radiation by changing its chemical and physical properties and which emits a measurable luminescent light when excited by a read-out radiation, the photoluminescent material containing homogeneous particles of arsenic and phosphorus embedded therein which particles can be excited by neutron radiation and then produce beta particles, or protons, or beta particles and protons which generate a measurable Cerenkov radiation in the photoluminescent material.

2. Measuring element as claimed in claim 1, characterized in that the photoluminescent material is an iron sulphate solution to which arsenic and phosphorus have been added for neutron activation.

3. Measuring element as defined in claim 1 wherein the photoluminescent material is a silver-activated phosphate glass whose phosphorus atoms provide said phosphorus particles and can be excited by neutrons so as to generate a detectable emission of protons.

4. Measuring element as claimed in claim 3 wherein said silver-activated phosphate glass is prepared from the compounds boron trioxide, lithium orthophosphate, aluminum pyrophosphate, phosphorus pentoxide, silver oxide and arsenic trioxide which provides said arsenic particles.

5. Measuring element as defined in claim 4 wherein the silver-activated phosphate glass has been converted to the vitreous state by melting said compounds and then cooling and after melting and before cooling the compounds are clarified at 1220°C and then stirred at 1040°C.

6. The measuring element of claim 3 wherein the arsenic particles do not impair the photoluminescent function of the silver-activated phosphate glass.

7. The measuring element of claim 3 wherein the silver-activated phosphate glass is prepared by vitrification by melting and cooling without reduction of the silver.

* * * * *